United States Patent [19]
Nuzzi et al.

[11] Patent Number: 6,135,681
[45] Date of Patent: Oct. 24, 2000

[54] FLAT BOTTOM TOOL

[75] Inventors: Joseph P. Nuzzi; Timothy G. Stokey, both of Dover; William H. Stokey, New Philadelphia, all of Ohio

[73] Assignee: Allied Machine & Engineering, Dover, Ohio

[21] Appl. No.: 09/137,647

[22] Filed: Aug. 21, 1998

[51] Int. Cl.[7] .................................................. B23B 51/00
[52] U.S. Cl. ........................ 408/227; 407/116; 407/54; 408/225; 408/231; 408/713
[58] Field of Search ............... 408/199, 223–225, 408/227, 229–231, 233, 713; 407/114, 115, 116, 54, 53

[56] References Cited

U.S. PATENT DOCUMENTS

| | | |
|---|---|---|
| 3,149,534 | 9/1964 | Stephens .................................. 407/54 |
| 3,555,964 | 1/1971 | Fleming ................................... 407/54 |
| 3,963,365 | 6/1976 | Shallenberger, Jr. . |
| 4,149,821 | 4/1979 | Faber . |
| 4,194,862 | 3/1980 | Zweekly . |
| 4,220,429 | 9/1980 | Powers et al. . |
| 4,248,555 | 2/1981 | Satou . |
| 4,278,373 | 7/1981 | Wolfe, III . |
| 4,373,593 | 2/1983 | Phaal et al. . |
| 4,373,839 | 2/1983 | Negishi et al. . |
| 4,412,571 | 11/1983 | Czerniewicz . |
| 4,488,840 | 12/1984 | Pollington . |
| 4,585,375 | 4/1986 | Erkfritz . |
| 4,620,822 | 11/1986 | Haque et al. . |
| 4,659,264 | 4/1987 | Friedline . |
| 4,893,968 | 1/1990 | Levy ........................................ 407/54 |
| 5,002,439 | 3/1991 | Lauder ..................................... 407/54 |
| 5,137,398 | 8/1992 | Omori et al. ........................... 408/713 |
| 5,154,549 | 10/1992 | Isobe et al. ............................ 408/713 |
| 5,154,550 | 10/1992 | Isobe et al. ............................ 408/713 |
| 5,226,760 | 7/1993 | Nishimura ................................ 407/54 |
| 5,228,812 | 7/1993 | Noguchi et al. ....................... 408/713 |
| 5,380,133 | 1/1995 | Schimmer . |
| 5,442,979 | 8/1995 | Hsu . |
| 5,626,466 | 5/1997 | Ching . |

FOREIGN PATENT DOCUMENTS 0001385  1/1978  Japan ..................................... 408/713

*Primary Examiner*—Daniel W. Howell
*Assistant Examiner*—Monica Smith Carter
*Attorney, Agent, or Firm*—Oldham & Oldham Co., L.P.A.

[57] ABSTRACT

The present invention is a drilling system for cutting flat bottomed holes in work pieces. The tool has two opposing angled cutting edges extending from a rotational axis, with the inner portions of these cutting edges extending upwardly to create an overlapping web at the center. The overlapping web strengthens the center portion of the cuttings edges of the tool. The angle at which the inner portion of the cutting edge is inclined can be increased to create a center point on the cutting surface of the tool. The center point adds stability to the tool as it rotates along its longitudinal axis. The cutting edge has a rake surface with a positive rake angle that lessens the forces on the insert and also allows for better formation of chips of stock material being removed. Chip breakers can be cut into the cutting edges of the insert, further aiding in the removal of stock material.

15 Claims, 2 Drawing Sheets

FLAT BOTTOM TOOL

FIELD OF THE INVENTION

The invention relates generally to a cutting insert to be placed into a tool holder for boring holes into metals. More specifically the invention relates to a cutting tool insert for boring flat bottomed holes into metals.

BACKGROUND OF THE INVENTION

Drilling systems are frequently used to provide cylindrical holes in metallic work pieces. The cutting or boring action of the drill system may be carried out by an elongated, substantially cylindrical drilling tool, such as a combination of a tool holder and a drill insert which is selectively attached thereto. Such an arrangement may then be used in an application wherein one end of the tool holder is securely mounted in a driving apparatus which rotates the holder about its longitudinal axis. At the opposite end of the elongated tool holder, the cutting insert engages the material to be cut. Alternatively, the workpiece may be made to rotate relative to the holder and cutting insert, such as in positioning the holder in the tailstock of a lathe or the like. Further, the tool and workpiece may be made to rotate relative to one another. The use of cutting inserts allows for quick changing of the insert upon wear of the cutting surfaces instead of the entire tool, and allows for one tool to be used for a variety of different boring application by simply changing the insert and not the entire drill assembly.

For many applications, it may be desirable to form a hole in a work piece which terminates in a flat bottom surface. In general, the drilling system as described above may utilize one type of drill insert for starting such a hole, and then using an insert to produce the desired flat bottom in the hole. Prior cutting inserts that were designed to cut flat bottomed holes have various deficiencies. For example, one type of these inserts had cutting edges extending from a center portion that were opposingly angled planes, with the center portion being removed in order to accommodate the cutting surfaces to cut a flat bottomed hole. The removal of this center area created a weakened area, point or line where the prior art inserts would occasionally break or fracture. Also, prior art flat bottom hole cutting inserts were designed with an imbalanced geometry causing it to wobble while drilling. This wobble or instability can cause deviations in the dimensions of the hole being bored, also known as runout, which is undesirable. Additionally, prior art drill systems and inserts were configured such that chips from the drilling process were not formed efficiently, causing deterioration of the cutting surfaces. The configuration of the cutting surfaces also did not allow for producing positive rakes in association with chip removal flutes to facilitate chip formation.

SUMMARY OF THE INVENTION

The present invention is directed to a drilling system and drill insert configuration which allows substantially flat bottomed holes to be machined in an improved manner. The drilling system of the invention comprises a body member having a substantially cylindrical side surface and opposed mounting and cutting ends, and having a longitudinal axis. The body member is configured to be rotationally driven about the longitudinal axis or to have the workpiece rotate or both the body member and workpiece rotate relative to each other. At the cutting end of the body member, there are provided at least first and second cutting surfaces, with the first cutting surface extending radially from a position adjacent the longitudinal or rotational axis of the body to a first outer end. Although in various applications the body member and cutting surfaces are stationary with respect to a rotating workpiece, the axis of the body member and cutting surfaces may be referred to as the rotational axis, which in such an application is the axis about which the workpiece rotates. The second cutting surface also extends radially from a position adjacent the longitudinal or rotational axis of the body, but in a direction opposite to the first cutting surface and to a second outer end. A web extends between the at least first and second surfaces through the rotational axis of the body to connect the first and second cutting surfaces. In the preferred embodiment, the first and second cutting edges and web form a continuous surface which provides strength and tool stability. Also in the preferred embodiment, the first and second cutting surfaces are oppositely angled downwardly from a cutting edge to a terminating edge, with the web portion extending between the two cutting edges to strengthen the center portion of the flat bottom tool. The height of the cutting edges of each cutting surface remain consistent for formation of a flat bottom hole. In one preferred embodiment, a center point in the bottom surface of the hole is created by increasing the angle of an upwardly extending portion of the cutting edge adjacent the web.

In a further preferred embodiment of the invention, the drilling system comprises a tool holder having a substantially cylindrical side surface and a longitudinal axis, the tool holder having a mounting end and a cutting end. A drill insert having a rotational axis is selectively secured to the cutting end of the holder. The insert is secured in a position such that the rotational or central axis thereof is substantially coincident with the longitudinal axis of the holder. The insert has at least first and second cutting surfaces, the first cutting surface extending radially from a position adjacent the rotational axis of the insert to a first outer end. The second cutting surface extends radially from a position adjacent the rotational axis in a direction opposite the first cutting surface and to a second outer end. A web extends between the at least first and second surfaces through the rotational axis to connect the first and second cutting surfaces.

In both of the above embodiments, stress at the center portion of the tool or insert is further decreased by the cutting surface having a balanced geometry. The balanced geometry of the tool also prevents the tool from wobbling and creating deviations in the hole being formed.

The preferred flat bottom tool insert of the present invention may be provided with bores which allow the insert to be attached to a tool holder. The bores may be offset with bores in the holder to allow the insert to be drawn into engagement with a seat provided in the tool holder. Also a slot may be cut into the bottom of the insert to accommodate a positioning member provided in the seat or insert slot of the holder in order that the insert is seated and positioned properly in the tool holder.

Flutes may be formed in association with the first and second cutting surfaces for removal of chips of material cut by the cutting edges, the flutes may be formed with a positive rake to facilitate chip formation. Optionally, chip breakers can be cut into the cutting surface edges of the flat bottom tool insert to allow for easier removal of stock material.

It is therefore an object of the present invention to provide a drilling system that can cut flat bottomed holes without the deficiencies of the prior art.

It is a further object of the present invention to provide a drilling system that is balanced so that the tool does not wobble within the hole and therefore create deviations in the hole being bored.

It is still a further object of the present invention to provide a drilling system for producing flat bottomed holes that has a positive rake that allows it to more easily form chips of stock material from the hole being bored.

These and other objects and advantages of the invention as well as the details of illustrative embodiments, will be more fully understood from the following specification and drawings.

DETAILED DESCRIPTION OF THE PREFERRED EMBODIMENT

Reference will now be made in detail to the present preferred embodiments of the present invention, examples of which are illustrated in the accompanying drawings. Whenever possible, the same reference numbers will be used throughout the drawings to refer to the same or like parts.

Figure 1:
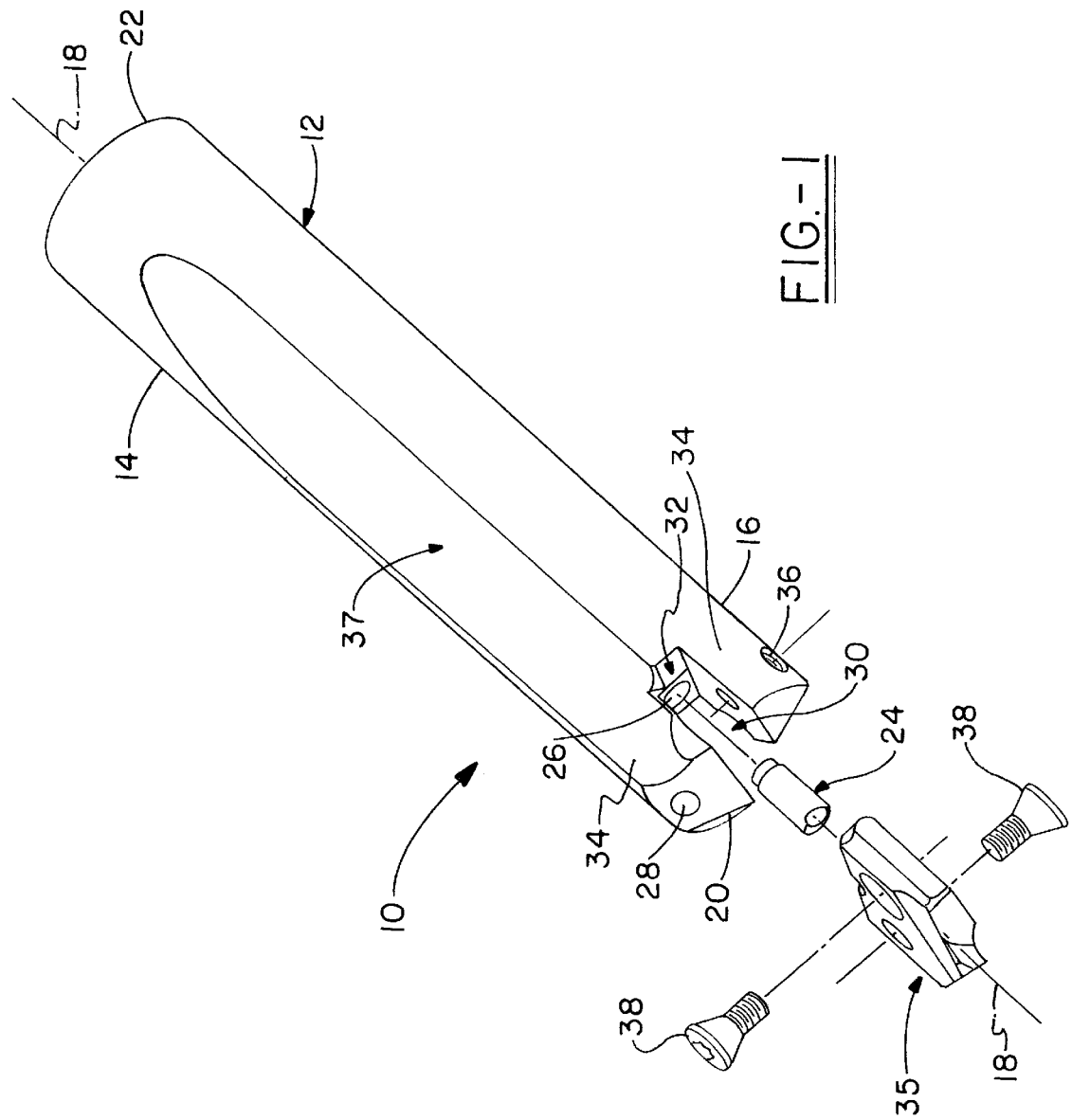
FIG. 1 is an exploded view of a drill tool assembly of a preferred embodiment.

In the present invention, the preferred embodiment of the invention comprises an assembly of parts, but it should be understood that these components could be formed as an integral drilling system. In the preferred embodiment, the drill tool assembly 10 comprises a holder 12, which has a shank 14 and head portion 16 associated therewith. In the preferred embodiment, holder 12 has in general a cylindrical shape with a first end 20 and second end 22 with the second end 22 and portion of shank 14 adapted to be fixedly attached in a drilling machine for use. As shown in FIG. 1, the first end 20 of holder 12 has a clamping or holder slot 30 which may extend across the entire diameter of the head portion 16 or at least over a center portion thereof at the general location of the rotational axis 18 of holder 12. The holder slot 30 has a bottom wall 32 positioned in substantially perpendicular orientation relative to the rotational axis 18 of the holder 12. In the preferred embodiment, the assembly 10 may further include a locating boss or dowel pin 24 which is positioned precisely with respect to the axis 18 and extends from the bottom wall 32 of the holder slot 30. The pin 24 may be positioned within a hole 26 extending downwardly from the bottom wall 32 of slot 30 along the axis 18 of the holder body in a press fit or other securing relationship to position pin 24. Alternatively, the locating boss which in the preferred embodiment comprises pin 24, may be configured in another manner to achieve the corresponding functionality of pin 24, such as an integral member extending from bottom wall 32. Within the holder slot 30, a drill insert 35 is precisely positioned with respect to the holder 12 to perform the desired drilling function in conjunction therewith. As will be hereinafter described in more detail, the insert 35 has a point geometry comprising a plurality of cutting surfaces which are precisely positioned with respect to the axis 18 of the holder 12, and which form a desired flat bottom hole geometry while minimizing errors in a resulting drilling operation using assembly 10.

More particularly, the preferred embodiment of holder 12 may be configured to include at its first end 20 a pair of clamping arms 34 which extend about holder slot 30. The clamping arms 34 preferably include apertures 36 which accommodate screws 38 to secure the drill insert 35 in its position within the holder slot 30. In the preferred configuration, the holes 36 are threaded to engage screws 38, and mate with screw holes formed in the drill insert 35 in a predetermined manner to precisely locate the drill insert in a predetermined location within holder slot 30. Each of the clamp arms 34 may also include a lubrication vent 28 which allows the application and flow of lubrication adjacent the cutting surfaces of the drill insert to facilitate the drilling operation. The clamp arms 34 may also include angled or curved surfaces which facilitate chip removal via chip evacuating grooves 37 on each side of the holder 12. The seating surface 32 is also shown to be designed as a planar surface which corresponds to the planar bottom portion of the preferred drill insert 35, although another configuration of bottom surface 32 my be employed and is contemplated herein.

Figure 2:
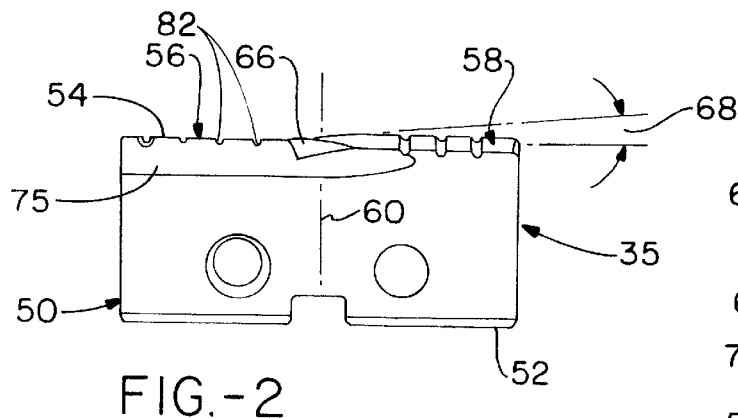
FIG. 2 is a side view of a first embodiment of a flat bottom drill insert of the present invention without a center point on the cutting surface.
Figure 3:
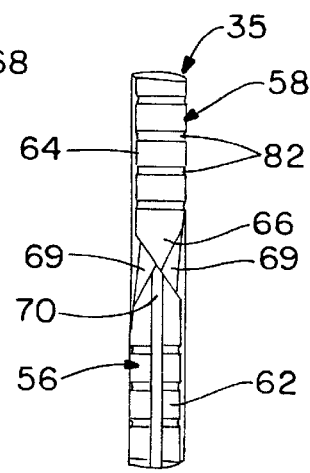
FIG. 3 is a top view of the flat bottom drill insert as shown in FIG. 2.
Figure 4:
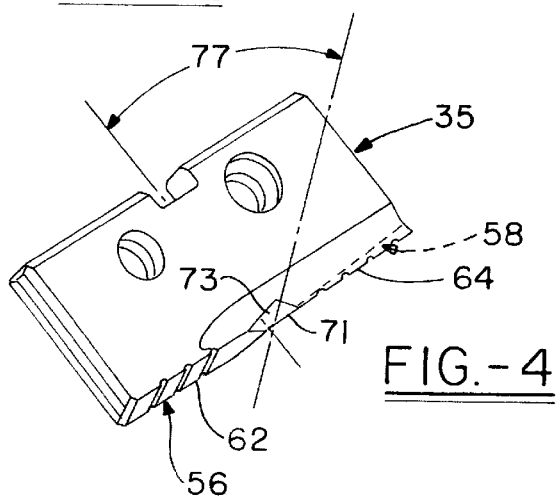
FIG. 4 is a perspective view from the upper left of the flat bottom insert of FIG. 2.

Turning to FIGS. 2–4 a preferred embodiment of the drill insert 35 is shown, and particularly the flat bottom cutting insert of the present invention without a center point is shown. It is reiterated that the insert 35 and associated cutting geometry as will be described, could be formed integrally in the body of holder 12 to form an integrated drilling tool, such an embodiment being contemplated in the invention. The insert 35 may have four sides with the upper side provided with a particular cutting geometry to form flat bottom holes. The cutting geometry is made up of a first surface 56 and a second surface 58, each having a cutting edge 62 and 64 respectively. Surfaces 56 and 58 and associated cutting edges 62 and 64 are configured to work in conjunction with one another to form a substantially flat bottomed hole. In possible applications of the drilling system, this type of insert may have a primary use to flat bottom pre-existing holes the same size as the tool. Alternatively, the drilling system may also be used to counter bore smaller size holes when used with shorter length holders. It should be recognized that the drilling system, whether an integral tool or an assembly including holder 12 in combination with insert 35, may be provided in any desired diameter or size for a particular application.

The insert 35 may be configured as a plate like body 50 having a thickness a lower side 52 and an upper side 54. The lower side 52 is seated on surface 32 of holder 12 as previously described. The side edges of the body 50 define the diameter or width of the hole formed by the drilling assembly. The upper side 54 of the body 50 is provided with at least two surfaces 56 and 58 and associated cutting edges 62 and 64 respectively, which serve to define a cutting geometry to form a flat bottomed hole. Each of the surfaces 56 and 58 extend radially from a position adjacent the center or rotational axis 60 of the insert 35. When insert 35 is positioned within tool holder 12 as previously described, and the tool holder 12 is rotated or the workpiece or both will rotate about its longitudinal axis, the insert 35 in conjunction with holder 12 will rotate about axis 60 to effect cutting of a work piece by means of cutting edges 62 and 64. From the cutting edges 62 and 64, the surfaces 56 and 58 form clearance surfaces which angle downwardly or away from their respective cutting edge to allow the formation and removal of chips of material during the cutting process. This angle of back clearance from cutting edges 62 and 64 may be of any suitable value for a particular application, but generally is a somewhat shallow angle to provide clearance without requiring excessive machining or the loss of material strength which would occur from a more severe angle. This back clearance angle is shown at 65 in FIG. 8 for reference. As should be evident from the figures, the respective surfaces 56 and 58 are angled downwardly from their respective cutting edges 62 and 64 in opposite directions to allow each cutting edge 62 and 64 to cut material as the tool and insert 35 rotate relative to the workpiece.

In a cutting geometry of this character, the opposed nature of the surfaces 56 and 58 and associated cutting edges 62 and 64 create a significant problem to the desired formation of a flat bottomed hole. To form a flat bottomed hole, the height of cutting edges 62 and 64 must remain consistent all the way to the center axis 60. If the cutting edges 62 and 64 continue to the rotational axis 60 of the insert without any variance, the cutting edge height would not remain consistent, and a flat bottom hole would not be produced. If the cutting surface is extended beyond the rotational axis 60, it should be evident that a portion of the cutting surface would oppose rotation of the insert at the location where the surface extends beyond the rotational axis 60. In the present invention, this problem is overcome by the formation of a slight upwardly inclined surface in each of the clearance surfaces 56 and 58 at a location immediately adjacent the rotational axis 60. The upwardly inclined surface associated with each of the cutting surfaces 56 and 58 is generally shown at 66 in FIG. 3, and extends in a plane aligned with the longitudinal axis of insert 35. In FIG. 2, surface 66 associated with surface 56 is shown, and angle 68 represents the angle of inclination of this surface relative to cutting edge 62 or horizontal. Because clearance surface 56 is angled downwardly from cutting edge 62 via the back clearance angle previously described, the upward inclination angle 68 of surface 66 is designed to work in conjunction with the back clearance angle such that these angles and the corresponding surfaces meet at approximately rotational axis 60 of insert 35. Also in association with each of the upwardly inclined surfaces 66 is a cutout portion 69 which works in combination with the back clearance angle 65 and angle of inclination or clearance transition angle 68 to form the desired cutting geometry. The cutout portions 69 remove the sharp corner of the cutting edge at a point adjacent the rotational axis 60 without destroying continuity of the cutting edges to facilitate obtaining the desired flat bottomed hole geometry.

To further facilitate forming the desired flat bottom hole geometry, the cutout portion 69 preferably includes first and second surfaces 71 and 73 as shown in FIG. 4. It should be recognized that on the opposed side of the rotational axis is a similar cutout portion although oppositely disposed. Surface 71 extends inwardly from cutting edge 64 to a line of intersection between surfaces 71 and 73 and to a point immediately adjacent to the formed web 70. Surface 73 then extends outwardly to intersect a portion of rake surface 75 below the height of web 70 so as not to interfere with the cutting action of the other cutting edge 62. The angle 77 as shown in FIG. 4 may be selected to accommodate these features. The angle 77 is chosen as a function of the desired web diameter intersecting the rake face or surface 75 and clearance transition angle 68 such that these surfaces meet at the same point. Because of the opposed nature of surfaces 56 and 58 and associated cutting edges 62 and 64, this configuration in association with each surface forms the web 70 at the location of the rotational axis 60 of insert 35, thereby forming a continuous surface which engages and forms the flat bottom hole geometries desired.

The web 70 formed by the configuration of the cutting surfaces with respect to one another provide significant advantage in the tool configuration. The web 70 significantly strengthens the insert at the area of the rotational axis 60, thereby eliminating a weakened zone and possible point of fracture as found in prior art designs. The web 70 further provides that each of the cutting edges 62 and 64 are substantially continuous to the rotational axis 60 to form a true flat bottom hole geometry rather than having a portion of the hole which is not machined or from which material is removed undesirably. The cutting edge of the insert 35 therefore remains at a consistent height along the entire profile of the cutting edge. This also greatly facilitates stability in use of the drilling system. This characteristic is achieved by the neutral or balanced geometry of the cutting surfaces, which significantly decrease any tendency of the drilling system to wobble in use.

Figure 8:
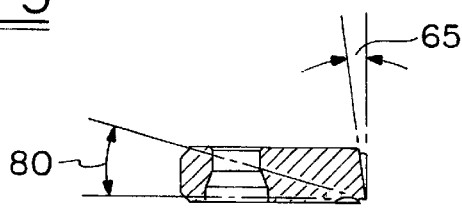
FIG. 8 is a side cross-sectional view of the flat bottom insert of the present invention.

Another significant benefit of the cutting geometry associated with the drilling system and drill insert according to the present invention is found in the relative ease of manufacture. In the preferred embodiment, the drilling system include insert 35 may be produced from a simple blank of material with less prefabrication steps therefore necessary in creation of the insert 35. The blank, being the plate-like body forming the insert 35, may then have the cutting surfaces 56 and 58 machined thereon, with only a relatively nominal amount of material removed at notches 69. In the prior art approaches, significantly more material would have to be removed in the cutting surface geometry, requiring more machining effort, and resulting in an imbalanced cutting geometry which tends to be unstable and wobbles. The cutting geometry of the present invention also facilitates the formation of a positive rake 75 adjacent the cutting edges 62 and 64 to greatly facilitate chip formation from the location adjacent the cutting edges. As shown in FIG. 8, the rake angle 80 is a positive angle which allows a sharp cutting edge to be formed with significant volume produced in the rake surface 75 for efficient formation of chips in a drilling operation. Further, if desired, each of the surfaces 56 and 58 can be provided with chip breakers 82 to facilitate the reduction and size of and removal of chips created in the drilling process.

The cutting geometry also allows a reduction in the diameter of the tool without compromising the effectiveness of the tool. As the diameter of the tool is reduced, the center geometry of the tool remains constant in this region. Therefore, a larger diameter tool may be machined to a reduced diameter conveniently.

Figure 5:
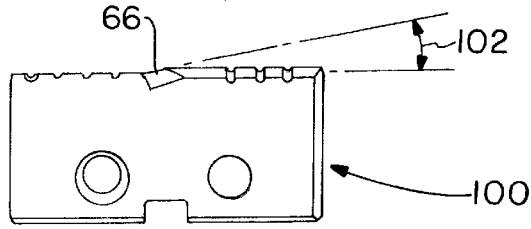
FIG. 5 is a side view of a flat bottom insert according to a further embodiment of the present invention having a center point on the cutting surface.
Figure 6:
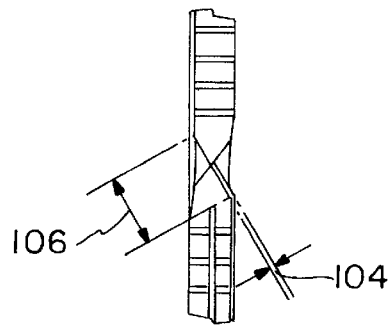
FIG. 6 is a top view of the flat bottom insert as shown in FIG. 5.
Figure 7:
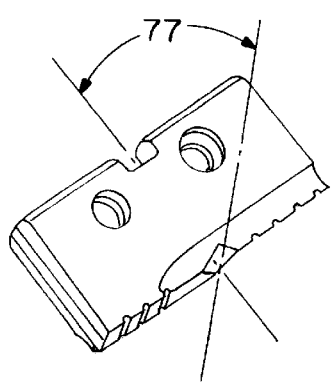
FIG. 7 is a perspective view from the upper left of the flat bottom insert as shown in FIG. 5.

Turning now to FIGS. 5–7, a similar insert construction is shown, but the cutting geometry is designed to produce a small center point in the flat bottom hole which is desirable for some applications. Creating a small center point or drill point at the center of the flat bottom hole may facilitate further machining processes desirable in a particular application. The center point in this embodiment also acts to improve the stability and strength of the tool. In the embodiment of FIGS. 5–7, many aspects of the drill insert 100 are similar, and reference to the previous description should be made relative thereto. In this embodiment, the inclination angle 102 of the inclined surface 66 associated with each of the surfaces 56 and 58 is increased. In this manner, the relationship between this inclined surface associated with each of the surfaces 56 and 58 in cooperation with the clearance angle 65 of each of the cutting surfaces (reference FIG. 8) cooperates to again form a web between the cutting surfaces, but also create a small point substantially along the rotational axis 60 of the insert 100. This geometry will form a small drill point in the flat bottom hole geometry. By increasing the clearance angle, the direction of the web between the cutting edges 62 and 64 begins to rotate relative to the rotational axis of the insert, but a continuous web is maintained. The diagonal thickness 104 as well as the web cutting diameter 106 can be modified to some degree by changing the clearance angle and/or angle of inclination of surfaces 66 to strengthen or otherwise to configure the tool as required for various applications.

The flat bottom tool of the present invention can be manufactured from materials such as high speed steel (HSS), carbide and other materials known in the art to have similar properties of hardness and edge sharpness retention. These base materials can then be coated with hard coating materials such as titanium nitride (TiN), titanium carbonitride (TiCN), and titaninum aluminum nitride (TiAlN) to further add hardness and edge retention qualities or other suitable coatings. Various combinations of these or other suitable base materials and coatings can be used to accommodate numerous applications.

Other embodiments and variations to the preferred embodiments described herein will be apparent to those skilled in the art and may be made without departing from the spirit and scope of the invention as defined in the appended claims.

What is claimed is:

1. A drilling system comprising a tool having a longitudinal axis, a substantially cylindrical side surface, and a mounting end and a cutting end, said cutting end having at least first and second cutting edge, said first cutting edge extending radially from a position adjacent said longitudinal axis to a first outer end, and said second cutting surface extending radially from a position adjacent said longitudinal axis in a direction opposite said first cutting edge to a second outer end, and including a web extending between said at least first and second cutting edges through said longitudinal axis which connects between said first and second cutting edges, to form a continuous cutting surface, wherein said first and second cutting edges and said web provide said cutting surface.

2. A drilling system comprising, a tool holder having a longitudinal axis, said tool holder having a first mounting end and a cutting end, a drill insert having a rotational axis, and being selectively secured to said cutting end of said holder in a position such that said rotational axis is substantially coincident with said longitudinal axis of said holder, said insert having at least first and second cutting edges, said first cutting edge extending radially from a position adjacent said rotational axis to a first outer end, and said second cutting edge extending radially from a position adjacent said rotational axis in a direction opposite said first cutting edge to a second outer end, and including a web extending between said at least first and second cutting edges through said rotational axis which connects said first and cutting edges to form a cutting surface for forming a substantially flat bottom hole in a work piece.

3. The drilling system according to claim 2, wherein said first and second cutting edges are formed in association with first and second clearance, said clearance surfaces having a width and each are provided with a cutting edge and a relief edge, wherein said clearance surface inclines downwardly from said cutting edge toward said relief edge.

4. A drilling system according to claim 3, wherein each of said first and second clearance surfaces further includes an upwardly inclined clearance transition surface adjacent said rotational axis, wherein the angle of inclination of the upwardly inclined clearance transition surface cooperates with the clearance angle of said clearance surface to form said web extending between said first and second cutting edges.

5. The drilling system according to claim 2, wherein said first and second cutting edges have a height, and wherein the height of each of said cutting edges and said web remain substantially consistent to form a flat bottom hole geometry.

6. The drilling system according to claim 2, wherein each of said cutting edges are formed in association with first and second clearance surfaces having an upwardly inclined clearance transition surface, such that each cutting edge is inclined upwardly at a position adjacent said rotational axis to form an elevated center point between said first and second cutting surfaces.

7. The drilling system according to claim 2, wherein each of said cutting edges has a portion of the cutting edge removed adjacent said rotational axis of said insert.

8. A drill insert comprising a body member adapted to be secured to a holder for rotation therewith, said body member having a cutting end with at least first and second cutting surfaces having opposed cutting edges, and a web extending between said opposed cutting edges, wherein upon rotation of said insert with said holder, said opposed cutting edges and said web cooperate to form a substantially flat bottom hole in a work piece.

9. The drill insert of claim 8, wherein said first and second cutting edges extend from a position adjacent the rotational axis of said insert to a respective outer edge of said insert, and said web extends through said rotational axis between said cutting edges.

10. The drill insert of claim 8, wherein said opposed cutting edges drill the outermost portion of said hole in said work piece to a position adjacent the rotational axis of said insert, with said web drilling the portion of said hole adjacent said rotational axis.

11. The drill insert of claim 8, wherein said first and second cutting surfaces are formed with first and second clearance surfaces, said clearance surfaces having a width and wherein each of said clearance surfaces are provided with a respective cutting edge and a relief edge, wherein said clearance surface inclines downwardly from said cutting edge toward said relief edge.

12. The drill insert according to claim 11, wherein each of said first and second clearance surfaces further includes an upwardly inclined clearance transition surface adjacent the rotational axis of said insert, wherein the angle of inclination of the upwardly inclined clearance transition surface cooperates with the clearance angle of said clearance surface to form said web extending between said first and second cutting edges.

13. The drill insert of claim 12, wherein said clearance transition surfaces are inclined at an angle to form a raised center point substantially at said rotational axis.

14. The drill insert of claim 8, wherein each of said cutting surfaces is formed with a rake surface having a positive rake angle.

15. The drill insert of claim 8, wherein said first and second cutting edges and said web are symmetrical about the rotational axis of said insert.

* * * * *